(12) United States Patent
Morisawa et al.

(10) Patent No.: US 7,128,304 B2
(45) Date of Patent: Oct. 31, 2006

(54) CONTROL VALVE FOR VARIABLE CAPACITY COMPRESSORS

(75) Inventors: Daisuke Morisawa, Tokyo (JP); Toshikio Okii, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 45 days.

(21) Appl. No.: 11/086,883

(22) Filed: Mar. 22, 2005

(65) Prior Publication Data

US 2005/0211939 A1 Sep. 29, 2005

(30) Foreign Application Priority Data

Mar. 25, 2004 (JP) .............................. 2004-088471

(51) Int. Cl.
*F16K 31/02* (2006.01)
(52) U.S. Cl. ........................ 251/129.18; 251/129.15; 251/129.19; 251/129.21
(58) Field of Classification Search ........... 251/129.15, 251/129.18–129.21
See application file for complete search history.

(56) References Cited

U.S. PATENT DOCUMENTS

| | | | |
|---|---|---|---|
| 4,894,999 A | | 1/1990 | Kaiju et al. |
| 5,051,631 A | * | 9/1991 | Anderson ..................... 310/14 |
| 5,890,876 A | * | 4/1999 | Suito et al. ................. 417/213 |
| 6,062,823 A | * | 5/2000 | Kawaguchi et al. ..... 417/222.2 |
| 6,062,824 A | * | 5/2000 | Kimura et al. ........... 417/222.2 |
| 6,217,290 B1 | * | 4/2001 | Imai et al. ................ 417/222.1 |
| 6,234,763 B1 | * | 5/2001 | Ota et al. ................. 417/222.2 |
| 6,361,283 B1 | * | 3/2002 | Ota et al. ................. 417/222.2 |
| 6,439,858 B1 | * | 8/2002 | Kume et al. ............. 417/222.2 |
| 6,485,267 B1 | * | 11/2002 | Imai et al. ................ 417/222.2 |
| 6,682,314 B1 | * | 1/2004 | Umemura et al. ....... 417/222.2 |
| 6,702,251 B1 | * | 3/2004 | Iwata et al. ............ 251/129.18 |
| 6,769,667 B1 | * | 8/2004 | Kume et al. ........... 251/129.18 |
| 6,848,475 B1 | * | 2/2005 | Smith .................... 137/625.65 |

FOREIGN PATENT DOCUMENTS

EP 1247981 A2 10/2002

* cited by examiner

*Primary Examiner*—J. Casimer Jacyna
(74) *Attorney, Agent, or Firm*—Baker Botts L.L.P.

(57) ABSTRACT

A control valve for a compressor with a discharge port, a chamber port, a side chamber port, an intake port, a feed hole between the discharge port and the chamber port, an extraction hole between the side chamber port and the intake port; a feed valve controls the feed hole; an extraction valve controls the extraction hole; and a solenoid is capable of actuating the feed and extraction valves. In a first status, a minimum flow rate is secured at the extraction valve with the feed valve being fully opened. In a second status, the feed valve is fully closed and the extraction valve is fully opened. In an intermediate status, the feed valve is moved from a nearly closed state to a fully closed state depending on the value of control current. At the extraction valve, a predetermined flow rate is effectuated irrespective of its opening degree.

9 Claims, 5 Drawing Sheets

CONTROL VALVE FOR VARIABLE CAPACITY COMPRESSORS

BACKGROUND OF THE INVENTION

The present invention relates to a control valve for a refrigerating cycle which is to be applied to a variable capacity compressor. In particular, the present invention relates to a control valve for a variable capacity compressor, which is designed to control the supply of a cooling medium to be fed from a discharge pressure region to the crank chamber and the discharge of the cooling medium from the crank chamber to a suction region.

Since the compressor to be employed in the refrigerating cycle of the air conditioner for a vehicle is directly connected through a belt to the engine of vehicle, it is impossible to control the revolving speed of the compressor. Therefore, in order to realize an appropriate cooling capacity without being influenced by the revolving speed of the engine, variable capacity compressors which are capable of altering the compression capacity (discharge flow rate) thereof have been employed.

The variable capacity compressors are generally constructed such that the cooling medium which has been fed through a suction chamber communicated with an inlet duct is compressed before the cooling medium is discharged into a discharge chamber connected to a discharge duct, wherein the flow rate of the cooling medium to be discharged is altered depending on changes in pressure of the cooling medium in a pressure control chamber (crank chamber) which is designed to control the pressure of the cooling medium by means of a control valve. Japanese Patent Laid-open Publication (Kokai) 2002-303262, incorporated herein by reference, discloses a control valve for a refrigerating cycle, which is designed to control the cooling medium pressure in the crank chamber through the adjustment of opening and closing of the valve disposed on the inlet side, the adjustment being effected through the balance of cooling medium pressure between the cooling medium pressure of the variable capacity compressor and the reaction force of the bellows of the variable capacity compressor, thereby enabling the discharged cooling medium to flow from the discharge duct. It is thereby possible to adjust the cooling medium pressure in the crank chamber of the variable capacity compressors.

However, in order to realize a stable operation of the variable capacity compressor, it may occasionally be necessary to equalize the maximum flow rate upon the opening of the extraction valve. Further, in order to secure the minimum discharge flow rate of the variable capacity compressor, it may be necessary to secure a predetermined small flow rate upon the closing of the extraction valve.

BRIEF SUMMARY OF THE INVENTION

It is an object of the present invention to realize the equalization of the maximum flow rate upon the opening of the extraction valve. Another object of the present invention is to realize a predetermined minimum flow rate upon the closing of the extraction valve, thereby providing stable operation of the variable capacity compressor.

Further objects of the present invention are to facilitate the working of the control valve and to minimize the influence of the temperature of cooling medium on the solenoid magnetizing portion of control valve, thereby enhancing the durability of the control valve.

In an exemplary embodiment of the present invention, a control valve for a variable capacity compressor of integrated feed valve/extraction valve type, which includes a main valve body having a discharge duct-communicating port, an outflow side crank chamber-communicating port, an inflow side crank chamber-communicating port, with an intake duct-communicating port, a feed valve hole interposed between the discharge duct-communicating port and the outflow side crank chamber-communicating port, and an extraction valve hole interposed between the inflow side crank chamber-communicating port and the intake duct-communicating port, a feed valve body capable of opening and closing the feed valve hole to a full or certain extent, an extraction valve body capable of opening and closing the extraction valve hole, and a solenoid magnetization portion capable of actuating the opening and closing of the feed valve body and of the extraction valve body, wherein a first status may be checked when the feed valve body is fully opened and the extraction valve body is actuated to secure a minimum flow rate, a second status may be checked when the feed valve body is fully closed and the extraction valve body is fully opened, and an intermediate status between the first status and the second status may be checked when the feed valve body is opened to a certain extent depending on the value of control current, and wherein a predetermined flow rate is effectuated irrespective of the opening degree of the extraction valve body.

In one embodiment of the aforementioned control valve, a cross-sectional area of the cooling medium flow at the extraction valve hole 125 is formed smaller than a cross-sectional area of the cooling medium flow at a region of the extraction body 139 when the extraction valve body 139 is fully opened.

In another embodiment of the aforementioned control valve, when the length of the extraction valve body 139 is defined as L2 and the depth of an extraction valve chamber 133*b* where the extraction valve body 139 is disposed is defined as L1, the extraction valve body 139 is configured to form a space between the extraction valve body 139 and an extraction valve seat portion 127 formed in the main valve body 120, the height of the space corresponding to a width of L1–L2 in the first status, thereby permitting a predetermined quantity of the cooling medium to flow from the inflow side crank chamber-communicating port 126 through the space to the intake duct-communicating port 128.

In another embodiment of the aforementioned control valve, the extraction valve body 139 is disposed in the extraction valve chamber 133*b* formed at an upper portion of a plunger 133 and fixed to an upper portion of a push rod 138 formed integral with the plunger 133; the extraction valve chamber 133*b* is communicated with the intake duct-communicating port 128; and the push rod 138 is enabled, due to the resilient force of a plunger spring 133*a*, to move upward together with the plunger 133 and to contact with the extraction valve seat portion 127, thereby permitting an upper surface portion of the extraction valve body 139 not to completely close the extraction valve hole 125 but leaving a predetermined gap unclosed.

In another embodiment of the aforementioned control valve, the extraction valve body 139' is disposed in the extraction valve chamber 133*b* formed at an upper portion of a plunger 133 and fixed to an upper portion of a push rod 138 formed integral with the plunger 133; the extraction valve chamber 133*b* is communicated with the intake duct-communicating port 128; and the push rod 138 is enabled, due to the resilient force of a plunger spring 133*a*, to move upward together with the plunger 133 and to approach the extraction valve seat portion 127 of the main valve body 120, enabling an upper surface portion of the extraction valve body 139' to enter into the extraction valve hole 125.

In another embodiment of the aforementioned control valve, the cooling medium inhaled from an intake chamber 3 which is communicated with an inlet duct 1 is compressed and discharged into a discharge chamber 4 which is communicated with a discharge duct 2; the pressure of the cooling medium is controlled by means of a control valve provided with the solenoid magnetization portion 130 comprising the plunger 133; the solenoid magnetization portion 130 is provided therein with a pressure sensitive portion 145; the feed valve body 132a interposed between the discharge duct 2 and the crank chamber 12, and the extraction valve body 139 interposed between the crank chamber 12 and the inlet duct 1 are adapted to be opened and closed by the actuation of the solenoid magnetization portion 130 and by the balance between the reaction of a bellows 146 and the cooling medium sucking pressure Ps; the housing of the control valve 100 is configured to have a vertically elongated hollow cylindrical body, the hollow portion of which being constituted by, mentioned from top to bottom, a feed valve chamber 121 communicated with the crank chamber-communicating port 121d, a feed valve hole 122, a discharge duct-communicating port 123, a valve rod supporting portion 124, an extraction valve hole 125 communicated with the inflow side crank chamber communicating port 126, and a plunger chamber 130a communicated with the inlet duct-communicating port 128; and the hollow portion of the cylindrical body is provided therein with a valve rod 132 formed integral with the feed valve body 132a which is positioned in the feed valve chamber 121, and with the push rod 138 formed integral with the plunger 133 which is positioned in the plunger chamber 130a, the push rod 138 being provided with the extraction valve body 139.

In another embodiment of the aforementioned control valve, the cooling medium inhaled from an intake chamber 3 which is communicated with an inlet duct 1 is compressed and discharged into a discharge chamber 4 which is communicated with a discharge duct 2; the pressure of the cooling medium is controlled by means of a control valve 100 provided with the solenoid magnetization portion 130 comprising the plunger 133; the solenoid magnetization portion 130 is provided therein with the pressure sensitive portion 145; the feed valve body 132a interposed between the discharge duct 2 and the crank chamber 12, and the extraction valve body 139 interposed between the crank chamber 12 and the inlet duct 1 are adapted to be opened and closed by the actuation of the solenoid magnetization portion 130 and by the balance between the reaction of a bellows 146 and the cooling medium sucking pressure Ps; the housing of the control valve 100 is configured to have a vertically elongated hollow cylindrical body, the hollow portion of which being constituted by, mentioned from top to bottom, a feed valve chamber 121 communicated with the outflow side crank chamber-communicating port 121d, a feed valve hole 122, a discharge duct-communicating port 123, a valve rod supporting portion 124, an extraction valve hole 125 communicated with the inflow side crank chamber communicating port 126, and a plunger chamber 130a communicated with the inlet duct-communicating port 128; and the hollow portion of the cylindrical body is provided therein with a valve rod 132 formed integral with the feed valve body 132a which is positioned in the feed valve chamber 121, the valve rod 132 being provided integrally with the plunger 133 disposed in the plunger chamber 130a and with an extraction valve body 139', the extraction valve body 139' having an outer diameter D2 which is smaller than an inner diameter D1 of the extraction valve hole 125, thereby permitting the cooling medium to continue to flow at a very small flow rate even if the extraction valve body 139' is moved into a closed state.

By the way, every components mentioned above are identified by reference numerals shown in the drawings only for the purpose of facilitating understanding of the interrelationship of the present invention with the specific embodiments shown in the drawings. Therefore, the present invention should not be construed to be limited by these embodiments.

BRIEF DESCRIPTION OF THE SEVERAL VIEWS OF THE DRAWING

Throughout the figures, unless otherwise stated, the same reference numerals and characters are used to denote like features, elements, components, or portions of the illustrated embodiments.

DETAILED DESCRIPTION OF THE INVENTION

Figure 1:
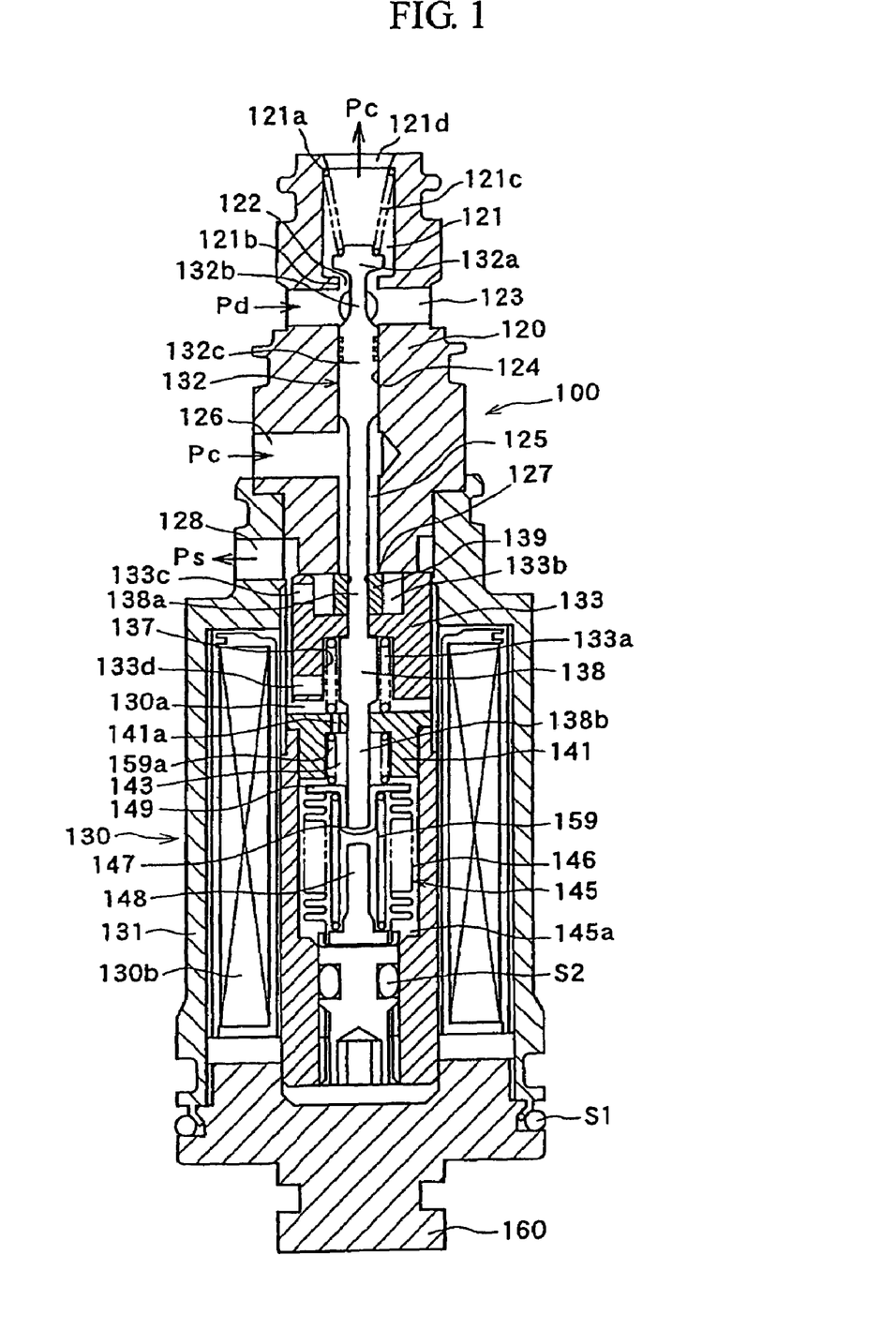
FIG. 1 is a longitudinal sectional view of a control valve to be employed in a variable capacity compressor according to a first embodiment of the present invention.
Figure 2:
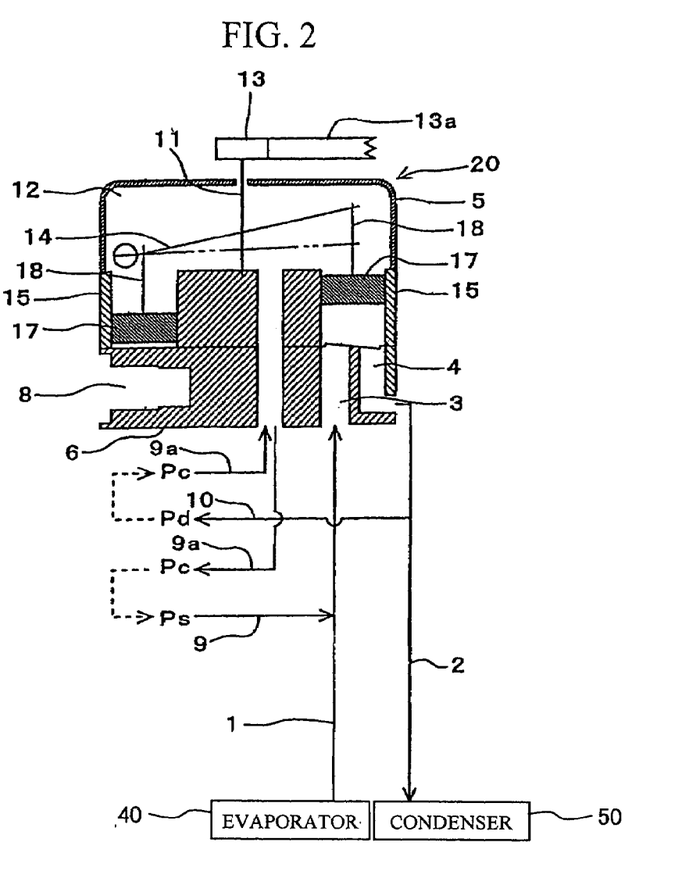
FIG. 2 is a schematic diagram for explaining the variable capacity compressor.
Figure 3:
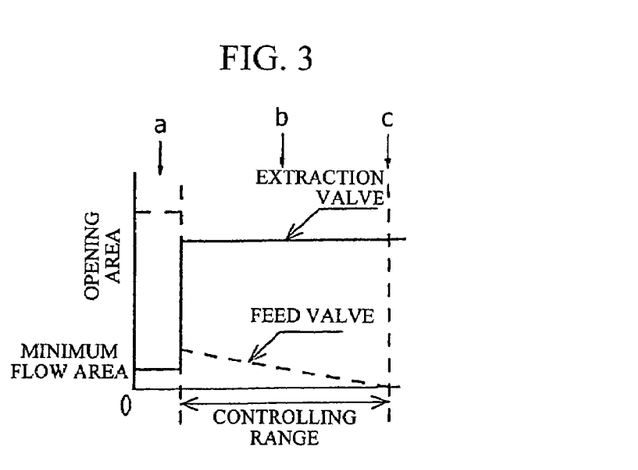
FIG. 3 is a graph for explaining the operation of the control valve of the first embodiment.
Figure 4:
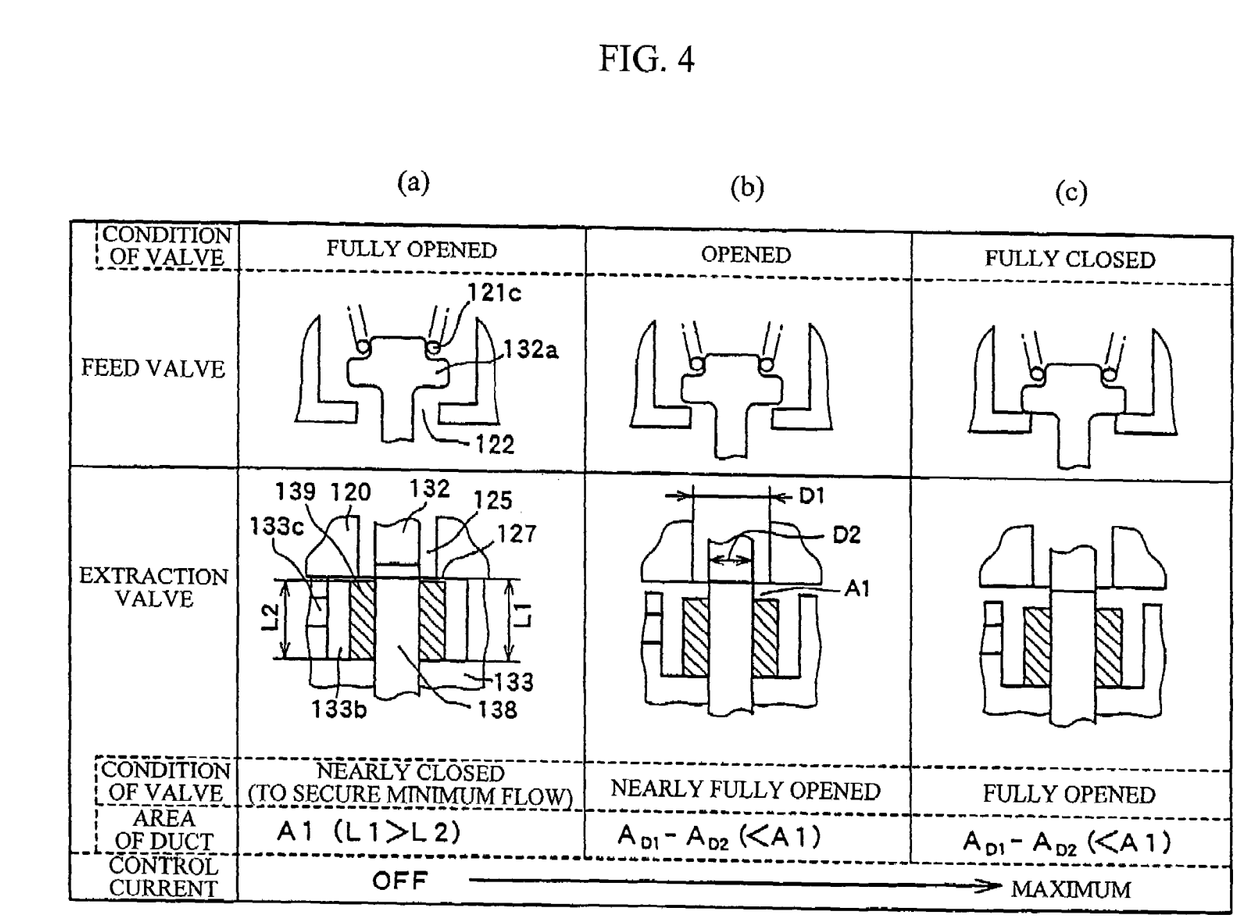
FIG. 4 is a schematic diagram for explaining the operation of the control valve of the first embodiment.

FIG. 1 illustrates a longitudinal sectional view of a control valve to be employed in a variable capacity compressor according to a first exemplary embodiment of the present invention. FIG. 2 is a schematic diagram of a variable capacity compressor implemented in accordance with an exemplary embodiment of the present invention. FIG. 3 is a graph relating to the operation of an exemplary control valve, and FIG. 4 is a schematic diagram relating to the operation of an exemplary control valve.

FIG. 1 is directed to a variable capacity compressor where the control valve of an exemplary embodiment of the present invention is employed. In FIG. 2, the reference numeral 20 represents a wobble plate-type variable capacity compressor which has been conventionally employed in the air-conditioning refrigerating cycle of motor car. As for the cooling medium, flon (fluorocarbon) may be generally employed. However, this variable capacity compressor is also applicable to a refrigerating cycle where carbon dioxide is employed as a cooling medium. Therefore, there are no limitations with regard to the cooling medium. This variable capacity compressor 20 is sustained by a front housing 5 and a rear housing 6 which is formed integral with the front housing 5.

The reference numeral 11 represents a rotation axis which is disposed in a crank chamber 12 (pressure control chamber) constructed air-tight. This rotation axis 11 is axially connected with the axis of a pulley 13 which is adapted to be rotated by means of a driving belt 13a which is designed to be directly driven by an engine. As this rotation axis 11 is rotated, a rocking plate 14 which is disposed in the crank chamber 12 in an inclined manner relative to this rotation axis 11 is caused to oscillate. In the interior of a cylinder 15 which is attached to a peripheral portion of the crank chamber 12, there are disposed a couple of pistons 17 each being permitted to reciprocatively move and coupled via a rod 18 to the rocking plate 14.

As a result, when the rocking plate 14 is rotated or oscillated, the pistons 17 are caused to reciprocatively move in the cylinder 15, thereby permitting a cooling medium of low pressure (the cooling medium sucking pressure, or cooling medium pressure, Ps) to be fed into the cylinder 15 from an intake chamber 3. The cooling medium thus fed is compressed in the cylinder 15 to create a cooling medium of high-pressure (the cooling medium discharging pressure Pd), which is then delivered to a discharge chamber 4. The feeding of the cooling medium to the intake chamber 3 is performed via an intake duct 1 from an upstream side evaporator 40, and the discharge of the high-pressure cooling medium from the discharge chamber 4 to a downstream side condenser 50 is performed via a discharge duct 2.

The angle of inclination of the rocking plate 14 is caused to change according to the pressure of the cooling medium inside the crank chamber 12 (the cooling medium pressure Pc in the crank chamber). Depending on the magnitude of the inclined angle of this rocking plate 14, the length of the stroke of the pistons 17 is caused to alter, thereby altering the discharge rate (i.e. compression capacity) of the cooling medium from the cylinder 15. The discharge of the cooling medium increases as the inclined angle of this rocking plate 14 is increased as indicated by a solid line in FIG. 2, and hence the discharge of the cooling medium decreases as the inclined angle of this rocking plate 14 is decreased as indicated by a two-dot chain line. Therefore, when this rocking plate 14 is turned perpendicular to the rotation axis 11, the discharging rate of the cooling medium becomes zero.

Next, the control valve 100 which is applicable to the aforementioned variable capacity compressor 20 will be explained in detail.

The control valve 100 shown in FIG. 1 is mounted on one side of the variable capacity compressor 20 of FIG. 2 where the rear housing 6 is located. More specifically, the control valve 100 is disposed in a control valve-mounting space 8 formed in the rear housing 6 in such a manner that the control valve 100 is kept airtight by making use of an O-ring S1. As shown in FIGS. 1 and 2, the discharge duct 2 is communicated via a discharge duct 10 with the discharge duct-communicating port 123 of the control valve 100. Further, the intake duct 1 is communicated via an intake duct 9 with the intake duct-communicating port 128 of the control valve 100. The crank chamber 12 is communicated via a couple of crank chamber ducts 9a with the outflow side crank chamber-communicating port 121d as well as with the inflow side crank chamber-communicating port 126.

As shown in FIG. 1, the control valve 100 is constituted mainly by the main valve body 120, the solenoid magnetization portion 130 for controlling the variable compression capacity through the control of the cooling medium pressure Pc in the crank chamber 12, and the pressure-sensitive portion 145, wherein the solenoid magnetization portion 130 is disposed at a low portion of the control valve 100, the pressure-sensitive portion 145 is disposed inside the solenoid magnetization portion 130, and the main valve body 120 is disposed on the top portion of the solenoid magnetization portion 130.

The solenoid magnetization portion 130 includes a solenoid housing 131 which is attached through a solenoid supporting cylinder 135 to the bottom portion of the main valve body 120. Inside the solenoid housing 131, there are disposed a solenoid 130b, a plunger 133 which is adapted to move up and down by the magnetization of the solenoid 130b, and a suction member 141. A plunger chamber 130a in which the plunger 133 is disposed is communicated with the intake duct-communicating port 128 formed in the solenoid housing 131. Further, the solenoid 130b is connected via a coil assembly 160 with a lead wire which is designed to feed an exciting current to be controlled by a control portion (not shown). Inside the solenoid supporting cylinder 135, there is slidably disposed plunger 133.

In a cavity 137 formed at a lower portion of the plunger 133, there is disposed a large diametrical portion constituting a lower portion of the push rod 138. A suction member-contacting portion 138b constituting a lower portion of the push rod 138 which is located below the aforementioned large diametrical portion is penetrated through and slidably sustained by a hole formed in the suction member 141, the lower portion of the suction member-contacting portion 138b being protruded into a pressure-sensitive chamber 145a, thereby permitting the distal end of the suction member-contacting portion 138b to contact with a stopper 147 of a flange 149 placed on the top portion of a bellows 146. Between the plunger 133 and the suction member 141, there is interposed a plunger spring 133a urging the plunger 133 to move away from the suction member 141. Further, the suction member 141 is provided with a pressure-equalizing hole 141a enabling the plunger chamber 130a to communicate with the pressure-sensitive chamber 145a.

Among the stopper 147 disposed at an upper portion of the bellows 146 arranged inside the pressure-sensitive chamber 145a and the stopper 148 disposed at a lower portion of the bellows 146, the stopper 147 is mounted below the lower end of the suction member-contacting portion 138b in such a manner that the stopper 147 is enabled to contact with or move away from the lower end of the suction member-contacting portion 138b. Between the flange 149 formed integral with the stopper 147 and a lower cavity 143 formed in the suction member 141, there is disposed a spring 159a which is designed such that the stopper 147 is urged to move away from the suction member 141.

The pressure-sensitive portion 145 includes the pressure-sensitive chamber 145a which is arranged inside the solenoid 130b. In this pressure-sensitive chamber 145a, there are disposed the bellows 146 which is designed to actuate, through the suction member-contacting portion 138b, etc., the plunger 133 and also a bellows-supporting spring 159. Further, the pressure-sensitive chamber 145a is designed such that a cooling medium pressure Ps can be introduced therein through a second pressure-equalizing hole 133d formed in the plunger 133 and through the plunger chamber 130a. Furthermore, the bellows 146 is enabled to expand or shrink depending on the magnitude of the cooling medium pressure Ps, thereby causing the push rod 138 to move in the elevational direction through the suction member-contacting portion 138b and the plunger 133.

As shown in FIGS. 1 and 2, the control valve 100 is operated such that the cooling medium that has been fed from an intake chamber 3 which is communicated with an inlet duct 1 is compressed and then discharged into a discharge chamber 4 which is communicated with a discharge duct 2, and that the pressure of the cooling medium is controlled by means of the control valve 100 provided with the solenoid magnetization portion 130 comprising the plunger 133.

The control valve 100 is constituted by the main valve body 120, the solenoid magnetization portion 130 for controlling the pressure of cooling medium in the crank chamber 12, and the pressure-sensitive portion 145, wherein the solenoid magnetization portion 130 is disposed below the bottom portion of the control valve 100, the solenoid magnetization portion 130 is provided therein with the pressure-sensitive portion 145, and the main valve body 120 is mounted on the top of the solenoid magnetization portion 130. By the actuation of the solenoid magnetization portion 130 and by making use of the balance between the reaction of the bellows 146 and the cooling medium pressure, not only the opening and closing of the feed valve body 132a interposed between the discharge duct 2 and the crank chamber 12, but also the opening and closing of the extraction valve body 139 interposed between the crank chamber 12 and the inlet duct 1 can be controlled.

The main valve body 120 is configured to have a vertically elongated hollow cylindrical body, the axial hollow portion of which being constituted by, mentioned from top to bottom, a feed valve chamber 121 communicated with the outflow side crank chamber-communicating port 121d, a feed valve hole 122, a discharge duct-communicating port 123, a valve rod supporting portion 124, and an extraction valve hole 125 (inner diameter: D1) communicated with the inflow side crank chamber communicating port 126, the extraction valve hole 125 being communicated with the extraction valve chamber 133b formed in the plunger 133. This extraction valve chamber 133b is communicated with the inlet duct-communicating port 128.

In the axial hollow portion of the main valve body 120, there is disposed a longitudinally elongated valve rod 132, having an outer diameter D2. This valve rod 132 comprises the feed valve body 132a positioned in the feed valve chamber 121, a neck portion (diametrically constricted portion) 132d positioned at the feed valve hole 122 and the discharge duct-communicating port 123, and a sustaining portion 132c wherein the valve rod 132 is adapted to be sustained. Further, the push rod 138 formed integral with the plunger 133 is disposed coaxial with this valve rod 132 so as to enable the push rod 138 to slide in the longitudinal direction. A lower end portion of the valve rod 132 is elastically contacted with a top portion of the push rod 138 at a lower end portion of the extraction valve hole 125, i.e. in the vicinity of the extraction valve seat 127.

As shown in the column of the extraction valve in FIG. 4, the extraction valve body 139, having a length L2, is configured cylindrically and located in the extraction valve chamber 133b, having a depth L1, formed on a top portion of the plunger 133 and is fixed to a top portion of the push rod 138. The depth of the extraction valve chamber 133b is made slightly larger than the length L2 of the extraction valve body 139, so that a gap "L1−L2" is permitted to be formed in a state where the top surface of the plunger 133 is contacted with the extraction valve seat 127.

The extraction valve chamber 133b is communicated, via a first pressure-equalizing hole 133c formed in the plunger 133, with the inlet duct-communicating port 128 (thus causing a cooling medium pressure Ps). When the push rod 138 is moved upward together with the plunger 133 by the resilient force of a plunger spring 133a and contacted with the extraction valve seat portion 127, the hole of the extraction valve hole 125 is entirely brought into an closed state by the upper surface of the extraction valve body 139 while leaving a very small gap (L1−L2) between the extraction valve hole 125 and the extraction valve body 139. Through the actuation of the solenoid magnetization portion 130, the feed valve hole 122 is opened or closed by the feed valve body 132a. In this opening and closing operation of the feed valve hole 122, the feed valve hole 122 may have a fully opened or closed state and may also have intermediate states, for example, an approximately closed state prior to a fully closed state.

As shown in the column (a) of FIG. 4, under the condition where the control current is turned OFF, the feed valve body 132a takes a fully opened state and the extraction valve body 139 takes an approximately closed state. Under this condition, while the feed valve body 132a takes a literally fully opened state, the extraction valve body 139 is permitted to secure a small gap ((Depth L1 of extraction valve chamber 133b)−(Length L2 of extraction valve body 139)), so that the cooling medium is permitted to flow from the extraction valve hole 125 through this small gap to the extraction valve chamber 133b. The control valve 100 is constructed such that a predetermined minimum quantity of cooling medium is permitted to flow from the crank chamber-communicating port 126 to the inlet duct-communicating port 128.

Next, the behavior of the control valve 100 will be explained together with the operation of the variable capacity compressor 20.

In the operating state of the variable capacity compressor 20, when the transmission of electric current to the solenoid magnetization portion 130 is turned OFF (a first state), the feed valve body 132a is brought into a state of "fully opened" and the extraction valve body 139 is brought into a state of "approximately closed" as shown in FIG. 4, column "a." Therefore, under this condition, the control of cooling medium pressure Pc in the crank chamber due to the fluctuations of the medium discharging pressure Pd and of the cooling medium pressure Ps is not carried out. Under this condition, although the feed valve body 132a takes a literally fully opened state, since the extraction valve body 139 is permitted to secure a small gap ((Depth L1 of extraction valve chamber 133b)−(Length L2 of extraction valve body 139), i.e. a duct cross-sectional area "A1"), the cooling medium is permitted to flow from the extraction valve hole 125 through this small gap to the extraction valve chamber 133b. A predetermined minimum quantity of cooling medium is permitted to flow from the crank chamber-communicating port 126 to the inlet duct-communicating port 128.

When an electric current is transmitted to the solenoid magnetization portion 130 to initiate the controlling of the cooling medium pressure (an intermediate state), the valve rod 132 is caused to descend a predetermined distance depending on the magnitude of electric current as shown in FIG. 4, column "b", thereby bringing the feed valve body 132a from the "fully opened" state to the "opened" state and, at the same time, bringing the extraction valve body 139 from the "approximately closed" state to the "opened" state.

When the electromagnetic force of the solenoid magnetization portion 130 is kept in a predetermined state (controlling condition), the opening degree of the feed valve body 132a is adjusted according to the fluctuations of the cooling medium pressure Ps. At the same time, by means of the push rod 138, the opening degree of the extraction valve body 139 (opening and closing) is also adjusted in the same manner as the feed valve body 132a (opening and closing) through the longitudinal movement of the extraction valve body 139. In the course of these adjustments, when the cooling medium pressure Ps is increased, the extraction valve body 139 is caused to descend, thus causing the feed valve body 132a to move in the direction of "closed" and at the same time, the extraction valve body 139 is also caused to move in the direction of "opened". Accordingly, a rapid decrease of the cooling medium pressure Pc in the crank chamber may be effectuated due to the cooperative effect to be derived from the feed valve body 132a and the extraction valve body 139.

Conversely, when the cooling medium pressure Ps is dropped in the course of these adjustments, the stopper 147 is caused to move upward, thus causing the feed valve body 132a to move in the direction of "opened" and at the same time, the extraction valve body 139 is also caused to move, through the valve rod 132, in the direction of "closed". Accordingly, a rapid rise of the cooling medium pressure Pc in the crank chamber may be effectuated due to the cooperative effect to be derived from the feed valve body 132a and the extraction valve body 139.

When the value of electric current to be transmitted to the solenoid 130b is altered to change the electromagnetic force of the control valve 100, the cooling medium pressure Pc in the crank chamber is caused to change accordingly, thus causing the compression capacity (discharging flow rate) to change. As a result, the cooling medium pressure Ps may be brought into a constant state at a different level.

Namely, when the electromagnetic force of the control valve 100 is decreased, the plunger 133 is caused to move upward a predetermined distance due to the urging force of the plunger spring 133a and to the reaction of the bellows 146, thereby causing both of the push rod 138 and the valve rod 132 to move upward, resulting in the upward movement of the feed valve body 132a (further increasing the magnitude of "opened" state). As a result, the flow rate of the cooling medium from the discharge duct-communicating port 123 to the feed valve chamber 121 is increased. At the same time, since the extraction valve body 139 is moved upward (further enhancing the magnitude of "closed" state), the flow rate of the cooling medium from the crank chamber-communicating port 126 to the inlet duct-communicating port 128 is decreased. Due to the cooperative effect to be derived from the feed valve body 132a and the extraction valve body 139, a rapid increase of the cooling medium pressure Pc in the crank chamber may be effectuated, thus moving the rocking plate 14 in the direction to become increasingly perpendicular to the rotation axis 11, thus quickly minimizing the discharging rate of the cooling medium (see FIG. 2).

When the electromagnetic force of the control valve 100 becomes maximum (a second state; see "c" column of FIG. 4), the plunger 133 is caused to descend due to the suction force of the suction member 141, thus permitting the valve rod 132 to move downward and hence the feed valve body 132a is caused to move downward to fully close the feed valve hole 122. As a result, the flow rate of the cooling medium from the discharge duct-communicating port 123 to the feed valve chamber 121 becomes zero and at the same time, the extraction valve body 139 is caused to move downward to fully open the extraction valve hole 125. As a result, the flow rate of the cooling medium from the crank chamber-communicating port 126 to the inlet duct-communicating port 128 is increased. Accordingly, the cooling medium pressure Pc is quickly dropped and the inclination angle of the rocking plate 14 to the rotation axis 11 is decreased to increase the discharging rate of the cooling medium.

Notably, the control of magnitude of electric current to be transmitted to the solenoid 130 is performed such that the signals detected by a plurality of sensors for detecting various kinds of conditions including those of the car engine, temperatures inside and outside the car, an evaporator, etc. are transmitted to the control portion provided therein with CPU, etc. and processed therein to generate control signals, which may then be transmitted from the control portion to the solenoid 130b, thus performing the aforementioned control of the electric current. The driving circuit of the solenoid 130b is omitted in the drawings, but would be familiar to one of ordinary skill in the art.

Under the conditions wherein the transmission of electric current to the solenoid 130b is suspended (FIG. 4, column "a"), the feed valve body 132a is moved away from the feed valve seat 121b due to a difference in force between the feed valve-closing spring 121c which is designed to urge the valve rod 132 of the control valve 100 and the plunger spring 133a, thereby bringing the feed valve body 132a into the "fully opened" state.

Then, as shown in FIG. 2, the cooling medium pressure Pc in the crank chamber is caused to increase, thereby urging the rocking plate 14 to move in the direction to become perpendicular to the rotation axis 11. However, before the rocking plate 14 becomes perpendicular to the rotation axis 11 and at the moment where the extraction valve body 139 is positioned in the fully closed state, it is enabled, due to the configuration of the extraction valve body 139, to secure a very small flow rate of cooling medium as shown in "a" column of FIG. 4, thus allowing the variable capacity compressor 20 to keep a state of minimum flow rate operation.

As explained above, since the variable capacity compressor 20 is capable of maintaining a state of minimum flow rate operation even when the transmission of electric current to the solenoid 130b of solenoid magnetization portion 130 is suspended (turned OFF), it is possible to maintain the rotation axis 11 rotating even when the variable capacity compressor 20 is not operated. As a result, the present invention may also be applicable to a clutch-less variable capacity compressor 20.

Furthermore, in order to render the feed valve body 132a to take the state of "opened" even when the control valve is turned OFF, the urging force of the feed valve-closing spring 121c may be adjusted to a value which is smaller than the urging force of the plunger spring 133a. However, the specific design of these forces may be optionally determined depending upon the characteristics of the particular embodiment of the present invention so as to effectuate the desired operation.

The control valve the above-described exemplary embodiment is designed such that through the detection of the cooling medium pressure Ps of the variable capacity compressor, a couple of valve bodies may be actuated to cause the cooling medium in the discharge duct (the cooling medium discharging pressure Pd) to flow into the crank chamber (the cooling medium pressure Pc in the crank chamber) to thereby adjust the feeding-side cooling medium pressure Pc in the crank chamber, and at the same time, to cause the cooling medium in the crank chamber to flow into the suction duct (the cooling medium pressure Ps) to thereby adjust the extracting-side cooling medium pressure Pc in the crank chamber. Through these adjustments of cooling medium pressure Pc, not only are the response characteristics to the adjusting control of the cooling medium pressure Pc in the crank chamber improved but also any unnecessary flow of the cooling medium from the discharge duct to the crank chamber may be minimized to enhance the controlling efficiency of the control valve.

Further, when the extraction valve body 139 is positioned in a closed state, it is possible, due to the configuration of the extraction valve body 139 to secure a very small flow rate of cooling medium as shown in FIG. 4, column "a", to keep the rotation axis 11 rotating.

Moreover, since the cross-sectional area ($A_{D1}-A_{D2}$) of the duct of the extraction valve hole 125 when the extraction valve body 139 positioned in an opened state is made smaller than the cross-sectional area (A1) of the duct portion where the extraction valve body 139 is located, it is possible to maintain the maximum flow rate constant irrespective of the state of the extraction valve body 139, as shown in FIG. 3.

Figure 5:
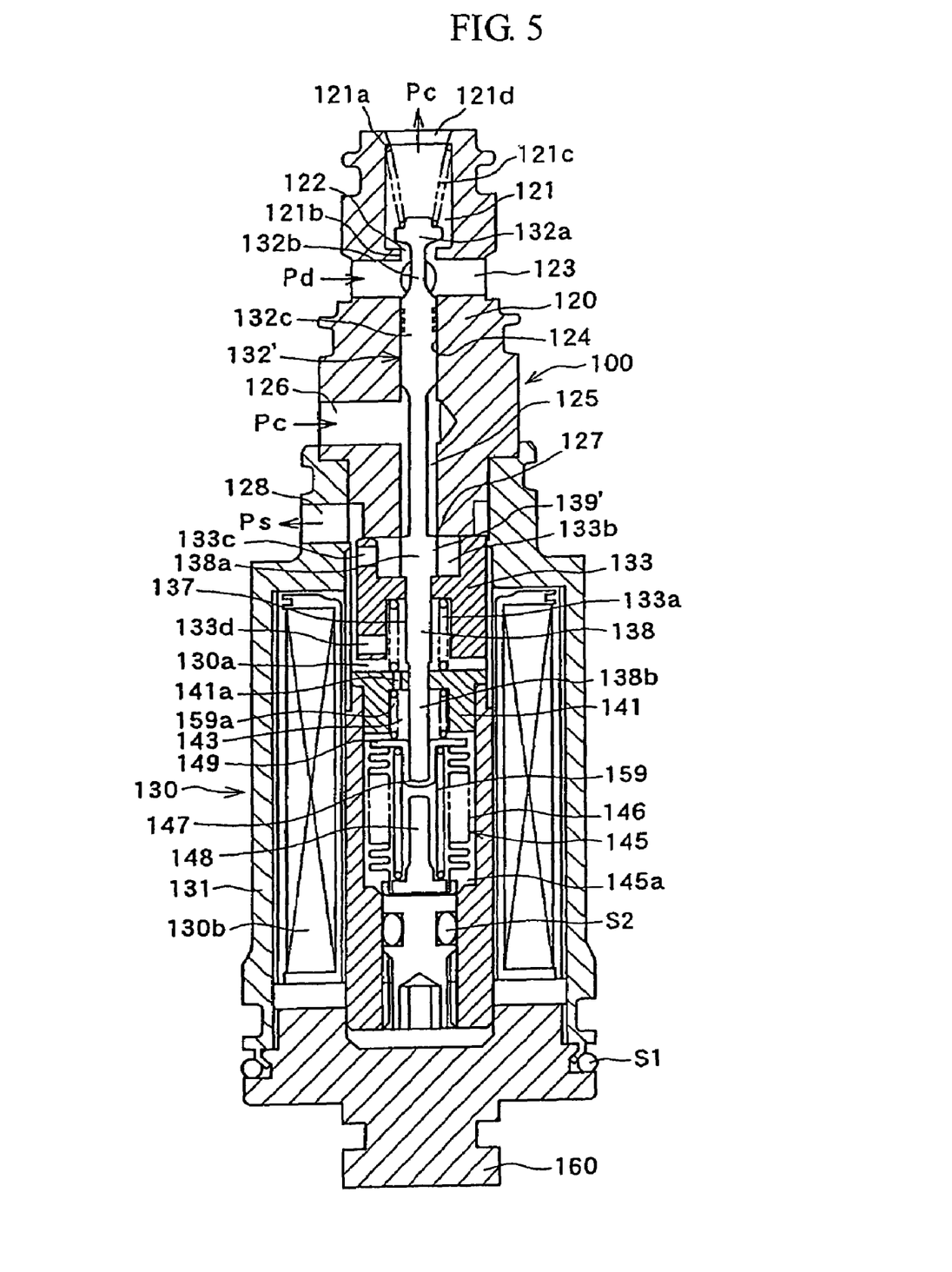
FIG. 5 is a longitudinal sectional view of a control valve according to a second embodiment of the present invention.
Figure 6:
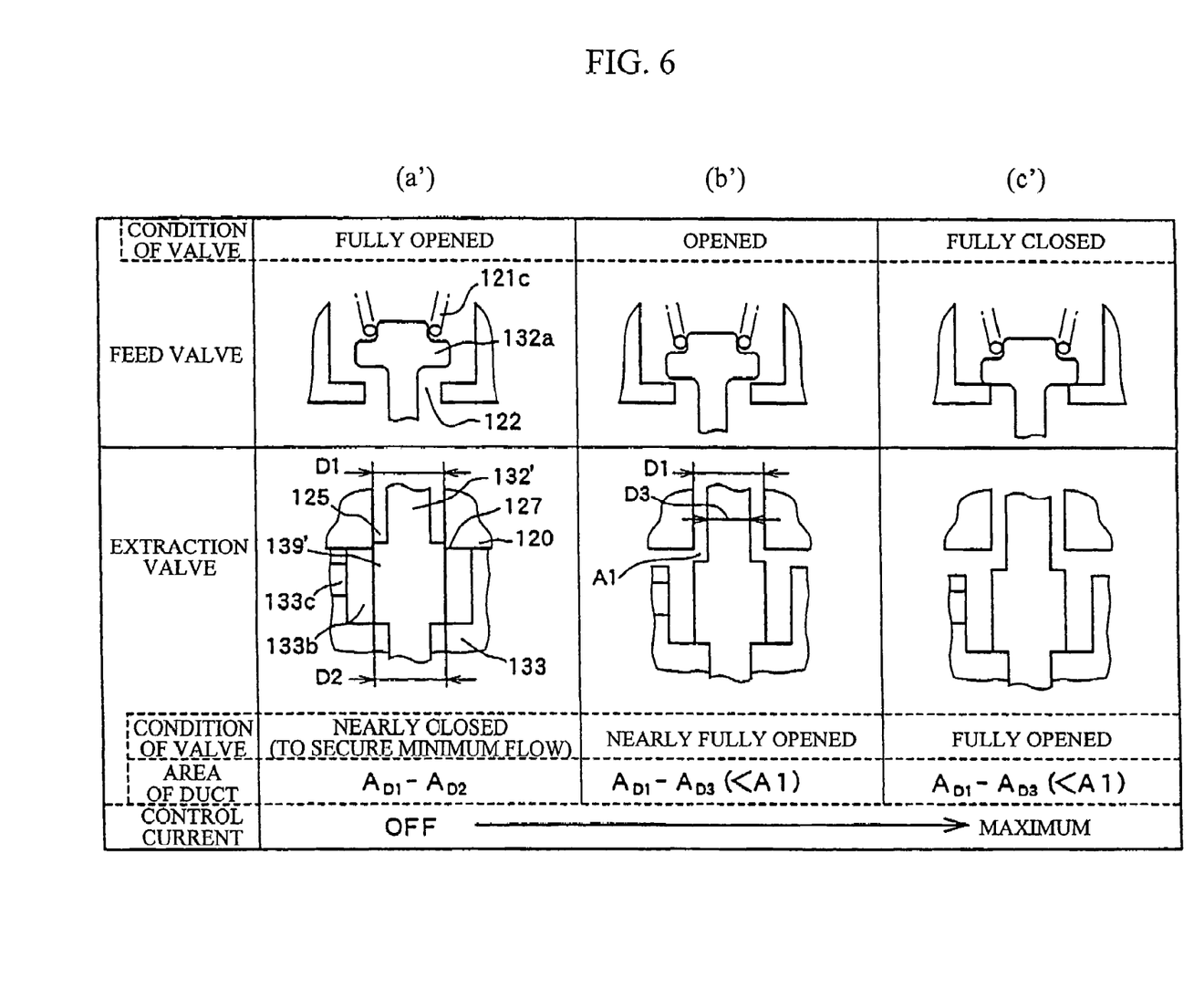
FIG. 6 is a schematic diagram for explaining the operation of the control valve according to the second embodiment of the present invention.

Another exemplary embodiment of the present invention is shown in FIGS. 5 and 6. FIG. 5 shows a longitudinal sectional view of the control valve of the present invention, and FIG. 6 is a schematic diagram for explaining the operation of the control valve, which corresponds to the format of FIG. 4.

This exemplary embodiment differs from that described above in that the valve rod 132 is formed integral with the push rod 138 (the resultant integral body will be referred to as "valve rod 132'") and that the cylindrical extraction valve body 139' is formed integral with the valve rod 132', having a diameter D3, thereby simplifying the structure and the manufacturing process of the control valve. Furthermore, according to this exemplary embodiment, the top surface of the extraction valve body 139' may be positioned higher than the top surface of the plunger 133, and the outer diameter D2 of the extraction valve body 139' may be smaller than the inner diameter D1 of the extraction valve hole 125, thereby creating a gap there between. When the extraction valve body 139' is positioned in a nearly closed state (a first state; see FIG. 6, column "a'"), an upper portion of the extraction valve body 139' is permitted to protrude into the extraction valve hole 125, thereby securing the cooling medium flow at a very small flow rate due to the existence of the aforementioned gap (cross-sectional area $A1=A_{D1}-A_{D2}$). In this way, it is possible to maintain the rotation axis 11 (see FIG. 2) rotating even when the variable capacity compressor 20 is not operated.

Additionally, on the occasion when the extraction valve body 139' is positioned in a nearly fully opened state (an intermediate state; see FIG. 6 , column "b'") or in a fully opened state (a second state; see FIG. 6, column "c'"), since the cross-sectional area ($A_{D1}-A_{D2}$) is made smaller than the cross-sectional area (A1) of the duct portion where the extraction valve body 139' is located, it is possible to maintain constant the flow rate of cooling medium passing through the extraction valve body 139' irrespective of the magnitude of the state or opening degree of the extraction valve body 139' as shown in FIG. 3.

In accordance with the present invention, it is possible to quantify the maximum flow rate upon the opening of the extraction valve. It is also possible to identify a predetermined minimum flow of cooling medium upon the closing of the extraction valve, thereby ensuring a minimum discharge flow rate of cooling medium in the variable capacity compressor. Additionally, it is possible to facilitate the operation of the control valve and to minimize the influence of the temperature of a cooling medium on the solenoid magnetizing portion of a control valve, thereby enhancing the durability of the solenoid magnetizing portion of the control valve.

While there have been described what are believed to be the preferred embodiments of the invention, those skilled in the art that other and further changes and modifications may be made thereto without departing from the spirit of the invention, and it is intended the claim all such changes and embodiment as for within the true scope of the invention.

We claim:

1. A control valve for a variable capacity compressor of integrated feed valve/extraction valve type, comprising:
   a main valve body having a discharge duct-communicating port, an outflow side crank chamber-communicating port, an inflow side crank chamber-communicating port, with an intake duct-communicating port, a feed valve hole interposed between the discharge duct-communicating port and the outflow side crank chamber-communicating port, and an extraction valve hole interposed between the inflow side crank chamber-communicating port and the intake duct-communicating port;
   a feed valve body capable of opening and closing the feed valve hole to a full or certain extent;
   an extraction valve body capable of opening and closing the extraction valve hole; and
   a solenoid magnetization portion capable of actuating the opening and closing of the feed valve body and of the extraction valve body;
   wherein a first status may be checked when the feed valve body is fully opened and the extraction valve body is actuated to secure a minimum flow rate, a second status may be checked when the feed valve body is fully closed and the extraction valve body is fully opened, and an intermediate status between the first status and the second status may be checked when the feed valve body is opened to a certain extent depending on the value of control current, and wherein a predetermined flow rate is effectuated irrespective of the opening degree of the extraction valve body.

2. The control valve according to claim 1, wherein a cross-sectional area of the cooling medium flow at the extraction valve hole is formed smaller than a cross-sectional area of the cooling medium flow at a region of the extraction body when the extraction valve body is fully opened.

3. The control valve according to claim 1, wherein when the length of the extraction valve body is defined as L2 and the depth of an extraction valve chamber where the extraction valve body is disposed is defined as L1, the extraction valve body is configured to form a space between the extraction valve body and an extraction valve seat portion formed in the main valve body, the height of the space corresponding to a width of L1−L2 in the first status, thereby permitting a predetermined quantity of the cooling medium to flow from the inflow side crank chamber-communicating port through the space to the intake duct-communicating port.

4. The control valve according to claim 3, wherein the extraction valve body is disposed in the extraction valve chamber formed at an upper portion of a plunger and fixed to an upper portion of a push rod formed integral with the plunger; the extraction valve chamber is communicated with the intake duct-communicating port; and the push rod is enabled, due to the resilient force of a plunger spring, to move upward together with the plunger and to contact with the extraction valve seat portion, thereby permitting an upper surface portion of the extraction valve body not to completely close the extraction valve hole but leaving a predetermined gap unclosed.

5. The control valve according to claim 1, wherein the extraction valve body is disposed in the extraction valve chamber formed at an upper portion of a plunger and fixed to an upper portion of a push rod formed integral with the plunger; the extraction valve chamber is communicated with the intake duct-communicating port; and the push rod is enabled, due to the resilient force of a plunger spring, to move upward together with the plunger and to approach the extraction valve seat portion of the main valve body, enabling an upper surface portion of the extraction valve body to enter into the extraction valve hole.

6. The control valve according to claim 2, wherein the extraction valve body is disposed in the extraction valve chamber formed at an upper portion of a plunger and fixed to an upper portion of a push rod formed integral with the plunger; the extraction valve chamber is communicated with the intake duct-communicating port; and the push rod is enabled, due to the resilient force of a plunger spring, to move upward together with the plunger and to approach the extraction valve seat portion of the main valve body, enabling an upper surface portion of the extraction valve body to enter into the extraction valve hole.

7. The control valve according to claim 3, wherein a cooling medium fed from an intake chamber which is communicated with an inlet duct is compressed and discharged into a discharge chamber which is communicated with a discharge duct, the pressure of the cooling medium is controlled by means of a control valve provided with the solenoid magnetization portion comprising the plunger, the solenoid magnetization portion is provided therein with a pressure-sensitive portion, the feed valve body interposed between the discharge duct and the crank chamber, and the extraction valve body interposed between the crank chamber and the inlet duct are adapted to be opened and closed by the actuation of the solenoid magnetization portion and by the balance between the reaction of a bellows and the cooling medium pressure;
  wherein the housing of the control valve is configured to have a vertically elongated hollow cylindrical body, the hollow portion of which being constituted by a feed valve chamber communicated with the outflow side crank chamber-communicating port, a feed valve hole, a discharge duct-communicating port, a valve rod supporting portion, an extraction valve hole communicated with the inflow side crank chamber communicating port, and a plunger chamber communicated with the inlet duct-communicating port; and
  wherein the hollow portion of the cylindrical body is provided therein with a valve rod formed integral with the feed valve body which is positioned in the feed valve chamber, and with the push rod formed integral with the plunger which is positioned in the plunger chamber, the push rod being provided with the extraction valve body.

8. The control valve according to claim 4, wherein a cooling medium fed from an intake chamber which is communicated with an inlet duct is compressed and discharged into a discharge chamber which is communicated with a discharge duct, the pressure of the cooling medium is controlled by means of a control valve provided with the solenoid magnetization portion comprising the plunger, the solenoid magnetization portion is provided therein with a pressure-sensitive portion, the feed valve body interposed between the discharge duct and the crank chamber, and the extraction valve body interposed between the crank chamber and the inlet duct are adapted to be opened and closed by the actuation of the solenoid magnetization portion and by the balance between the reaction of a bellows and the cooling medium pressure;
  wherein the housing of the control valve is configured to have a vertically elongated hollow cylindrical body, the hollow portion of which being constituted by a feed valve chamber communicated with the outflow side crank chamber-communicating port, a feed valve hole, a discharge duct-communicating port, a valve rod supporting portion, an extraction valve hole communicated with the inflow side crank chamber communicating port, and a plunger chamber communicated with the inlet duct-communicating port; and
  wherein the hollow portion of the cylindrical body is provided therein with a valve rod formed integral with the feed valve body which is positioned in the feed valve chamber, and with the push rod formed integral with the plunger which is positioned in the plunger chamber, the push rod being provided with the extraction valve body.

9. The control valve according to claim 5, wherein the cooling medium fed from an intake chamber which is communicated with an inlet duct is compressed and discharged into a discharge chamber which is communicated with a discharge duct; the pressure of the cooling medium is controlled by means of a control valve provided with the solenoid magnetization portion comprising the plunger; the solenoid magnetization portion is provided therein with the pressure-sensitive portion; the feed valve body interposed between the discharge duct and the crank chamber, and the extraction valve body interposed between the crank chamber and the inlet duct are adapted to be opened and closed by the actuation of the solenoid magnetization portion and by the balance between the reaction of a bellows and the cooling medium pressure;
  the housing of the control valve is configured to have a vertically elongated hollow cylindrical body, the hollow portion of which being constituted by a feed valve chamber communicated with the outflow side crank chamber-communicating port, a feed valve hole, a discharge duct-communicating port, a valve rod supporting portion, an extraction valve hole communicated with the inflow side crank chamber communicating port, and a plunger chamber communicated with the inlet duct-communicating port; and
  the hollow portion of the cylindrical body is provided therein with a valve rod formed integral with the feed valve body which is positioned in the feed valve chamber, the valve rod being provided integrally with the plunger disposed in the plunger chamber and with an extraction valve body, the extraction valve body having an outer diameter which is smaller than an inner diameter of the extraction valve hole, thereby permitting the cooling medium to continue to flow at a very small flow rate even if the extraction valve body is moved into a closed state.

* * * * *

UNITED STATES PATENT AND TRADEMARK OFFICE
CERTIFICATE OF CORRECTION

PATENT NO.        : 7,128,304 B2
APPLICATION NO. : 11/086883
DATED             : October 31, 2006
INVENTOR(S)       : Daisuke Morisawa and Toshiki Okii It is certified that error appears in the above-identified patent and that said Letters Patent is hereby corrected as shown below:

IN THE SPECIFICATION: On the Title Page (75)

Please replace the second inventor's name with the following:

-- Toshiki Okii, Tokyo (JP)--

Signed and Sealed this

Twentieth Day of March, 2007

JON W. DUDAS
*Director of the United States Patent and Trademark Office*